United States Patent [19]

Tsuyuguchi et al.

[11] Patent Number: 5,329,510

[45] Date of Patent: Jul. 12, 1994

[54] METHOD AND APPARATUS FOR DISCRIMINATING BETWEEN UNFORMATTED MAGNETIC DISK ASSEMBLIES OF TWO DIFFERENT STORAGE CAPACITIES

[75] Inventors: Hiroshi Tsuyuguchi, Tokyo; Shinichi Aikawa, Mitaka; Fumio Nagase, Tama, all of Japan

[73] Assignee: TEAC Corporation, Tokyo, Japan

[21] Appl. No.: 983,116

[22] Filed: Nov. 30, 1992

Related U.S. Application Data

[63] Continuation of Ser. No. 435,169, Nov. 13, 1989, abandoned.

[30] Foreign Application Priority Data

Nov. 15, 1988 [JP] Japan .................................. 63-288552

[51] Int. Cl.[5] .............................................. G11B 5/012
[52] U.S. Cl. ........................................ 369/47; 369/58; 360/25
[58] Field of Search ..................... 360/25, 65, 69, 133, 360/137; 369/53–54, 58, 47, 48, 50

[56] References Cited

U.S. PATENT DOCUMENTS

| | | | |
|---|---|---|---|
| 3,686,682 | 8/1972 | Behr et al. | 340/174.113 |
| 3,781,835 | 12/1973 | Dion et al. | 340/174.113 |
| 3,812,529 | 5/1974 | Yoichi | 300/25 |
| 4,038,692 | 7/1977 | Umeda et al. | 360/25 |
| 4,279,005 | 7/1981 | Kitamura et al. | 360/66 |
| 4,371,902 | 2/1983 | Baxter et al. | 360/75 |
| 4,509,118 | 4/1985 | Shenk | 364/200 |
| 4,607,295 | 8/1986 | Uno | 360/45 |
| 4,682,246 | 7/1987 | Efron et al. | 358/335 |
| 4,703,371 | 10/1987 | Redmond et al. | 360/75 |
| 4,853,915 | 8/1989 | Takasago et al. | 369/32 |
| 4,881,136 | 11/1989 | Shiraishi et al. | 360/25 |
| 5,047,874 | 9/1991 | Yomtoubian | 360/25 |
| 5,166,921 | 11/1992 | Matsui | 369/58 X |

OTHER PUBLICATIONS

Stallings, *Data and Computer Communications* (2d), pp. 104, 107.

*Primary Examiner*—W. R. Young
*Attorney, Agent, or Firm*—Woodcock Washburn Kurtz Mackiewicz & Norris

[57] ABSTRACT

A data transfer system of the type including a disk drive for selective use with flexible magnetic disk cartridges of first and second storage capacities (e.g. 1 MB and 4 MB), the first storage capacity being less than the second storage capacity, a host computer, and a controller for controlling the operation of the disk drive under the direction of the host computer. The controller is factory preprogrammed to discriminate between unformatted disk cartridges of the two different storage capacities as either of the two types of disk cartridges is loaded in the disk drive. The program is such that, in response to the first of a series of formatting commands at the first storage capacity from the host computer, the controller causes the disk drive to write track format for the second storage capacity on a preassigned track (e.g. inmost track) on the disk and then immediately to read the track format. If the retrieved track format contains errors, it follows that the loaded disk cartridge is of the first storage capacity. Accordingly, the controller proceeds to format the disk cartridge at the first storage capacity. If the retrieved track format does not contain errors, on the other hand, then the loaded disk cartridge is of the second storage capacity. Thereupon the controller signals the host computer to that effect.

4 Claims, 4 Drawing Sheets

METHOD AND APPARATUS FOR DISCRIMINATING BETWEEN UNFORMATTED MAGNETIC DISK ASSEMBLIES OF TWO DIFFERENT STORAGE CAPACITIES

This is a continuation, of application Ser. No. 435,169, filed Nov. 13, 1989, now abandoned.

BACKGROUND OF THE INVENTION

Our invention relates to a method of discriminating between flexible magnetic disk cartridges or assemblies of two different storage capacities (e.g. one-megabyte and 4-megabyte (MB)) preparatory to formatting as either of the two types of unformatted disk assemblies is loaded in an associated data transfer apparatus. Our invention also concerns the data transfer apparatus having provisions for such discrimination.

Flexible magnetic disk cartridges have for years been commercially available in capacities of 1 MB and 2 or 1.6 MB, the latter being known as the high density type. The disk cartridge of the 2-MB capacity has a notch in its housing so that on being loaded in a disk drive, the 2-MB disk cartridge is automatically identified as such. The user has had no trouble in discrimination between the 1- and 2-MB disk cartridges.

More recently, however, a 4-MB disk cartridge has been developed, offering the user a choice among three different storage capacities. A careful user can, of course, make proper use of the three different types of disk cartridges. Not all users can possibly be expected to be so careful.

It is therefore essential that data transfer systems for use with such different types of disk cartridges be equipped to automatically discriminate between them as such cartridges are loaded therein. For example, an unformatted 4-MB disk cartridge may be inadvertently inserted in the disk drive when the data transfer system comprising the disk drive is conditioned for formatting 1-MB disk cartridges. Then the 4-MB disk will be initialized with the format for 1-MB disks.

An obvious measure to prevent the noted inconvenience might be to form a notch or the like in the housing of the 4-MB disk cartridge and to provide the disk drive with means for optically or mechanically detecting the notch as the 4-MB disk cartridge is loaded therein. The disk drive would then be capable of distinguishing the 4-MB disk cartridge from the 1-MB one. We object to this solution because it would make the disk drive unnecessarily complex in construction, adding substantially to its manufacturing cost.

SUMMARY OF THE INVENTION

We have hereby invented how to enable a magnetic disk apparatus to automatically discriminate between unformatted disk assemblies of two different storage capacities as either of the two types of disk assemblies is loaded therein, without any substantial alteration of, or without addition to, the existing parts of the apparatus.

Summarized in its broader aspect, our invention provides a method of discriminating between unformatted disk assemblies of first and second storage capacities as either of the two types of disk assemblies is loaded in a data transfer system, the first storage capacity being less than the second storage capacity. The method of our invention dictates, first of all, the writing of track format data for the second storage capacity on the loaded disk assembly. Then the track format data is read out immediately from the loaded disk assembly. The loaded disk assembly can be identified as being of the first storage capacity if errors are detected from the retrieved track format data for the second storage capacity, and as being of the second storage capacity if no error is detected therefrom.

Typically, our invention may be applied to a data transfer system comprising a disk drive for selective use with 1-MB (first storage capacity) and 4-MB (second storage capacity) disk cartridges. The user may insert either the 1- or 4-MB disk cartridge in the disk drive. For discrimination between the two types of disk cartridges prior to formatting, the track format data for the 4-MB disk is tentatively written on, and immediately read from, the loaded disk cartridge.

The maximum bit density of the 1-MB disk is 8717 bits per inch (BPI) whereas that of the 4-MB disk is 34,868 BPI. Therefore, if the loaded disk cartridge is of the 1-MB capacity, the 4-MB track format data retrieved therefrom is undecipherable. From this fact it can be determined that the loaded disk cartridge is not of the 4-MB capacity. The 4-MB track format data can of course be read without errors if the loaded disk cartridge is of the 4-MB capacity.

As is conventional in the magnetic disk art, the disk drive is under the control of an external disk drive controller, which in turn operates under the direction of a host computer. We suggest that the disk drive controller be factory preprogrammed for discriminating between unformatted disk cartridges of two known storage capacities by the method of our invention. The disk discrimination program of the disk drive controller can be triggered by a 1-MB formatting command from the host computer following the loading of a disk cartridge of either 1- or 4-MB capacity. The 1-MB formatting command may be held unexecuted pending the execution of the disk discrimination program. If the loaded disk cartridge proves to be of the 1-MB capacity, the disk drive controller may format it under the 1-MB formatting command from the host computer.

If the loaded disk cartridge probes to be of the 4-MB capacity, on the other hand, then we recommend that the disk drive controller be programmed to deliver the familiar file protect signal to the host computer in order to prevent the formatting of the 4-MB disk in the 1-MB mode. The host computer will then need no modification of its existing program.

The above and other features and advantages of our invention and the manner of realizing them will become more apparent, and the invention itself will best be understood, from a study of the following description and appended claims, with reference had to the attached drawings showing a preferred mode of carrying out our invention.

DETAILED DESCRIPTION OF THE INVENTION

Figure 1:
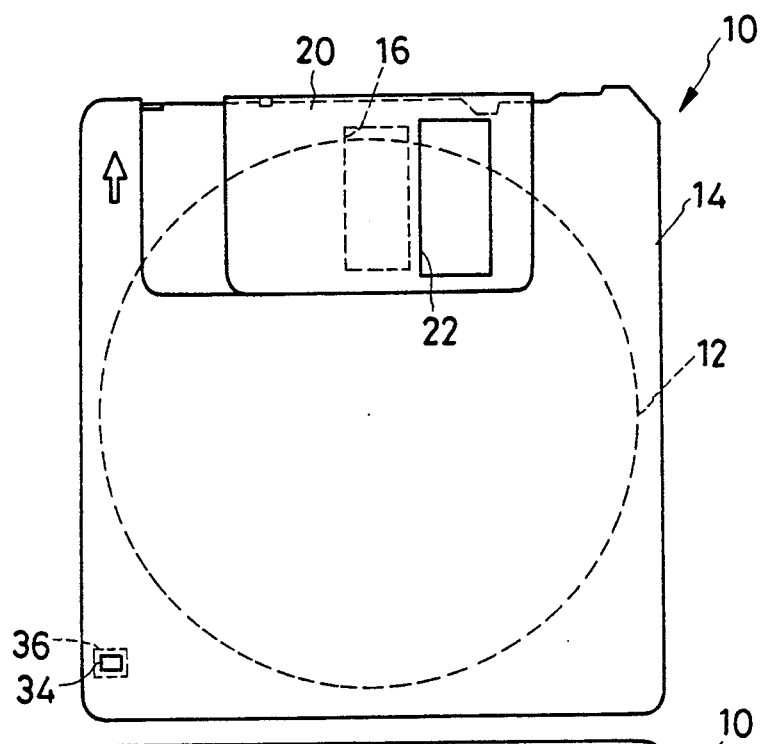
FIG. 1 is an illustration of one side of a flexible magnetic disk cartridge of known construction suitable for use with our invention.

We will divide the following detailed description under several headings for the clarity of disclosure. To be explained under the first heading is the construction of magnetic disk cartridges of two different storage capacities to be discriminated one from the other by our invention. We will then proceed to the description of the data transfer system for use with the disk cartridges. Finally we will discuss the method of discriminating between the two types of disk cartridges as they are loaded in the data transfer system.

Magnetic Disk Cartridges

The flexible magnetic disk cartridges of two different storage capacities have the same standardized mechanical construction, although they differ in track format, as will be detailed subsequently. We will use the same reference numeral 10 to designate the two types of disk cartridges by reason of their identical appearance.

Figure 2:
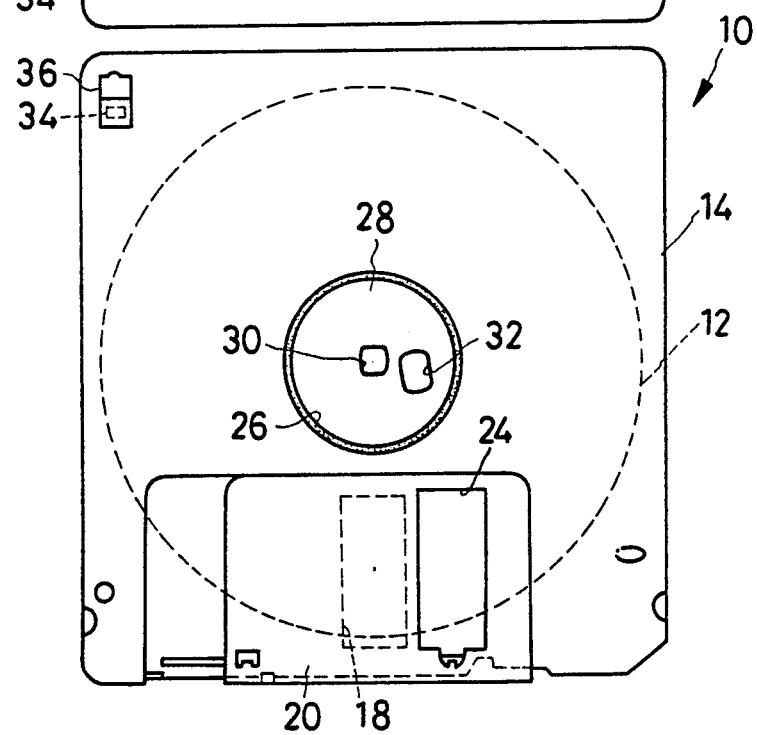
FIG. 2 is an illustration of the other side of the flexible magnetic disk cartridge of FIG. 1.

FIGS. 1 and 2 illustrate the disk cartridge 10 as seen from its opposite sides. The illustrated disk cartridge is of the type having a flexible magnetic disk 12 with a diameter of 86 millimeters encased in a generally flat, square housing 14 of rigid plastic material. The housing 14 has two apertures 16 and 18 of rectangular shape formed in alignment in its opposite sides to expose radial portions of the encased magnetic disk 12. Normally, and as shown, these apertured are closed by a metal-made U-shaped sliding shutter 20 mounted astride one edge of the housing 14. The shutter 20 has itself two apertures 22 and 24 which, when the shutter is moved to the left as viewed in FIGS. 1 and 2, are to come into register with the housing apertures 16 and 18. If double-sided, the magnetic disk 12 is to be caught between a pair of transducers or heads through the aligned housing apertures 16 and 18 and shutter apertures 22 and 24. If single-sided, on the other hand, then the magnetic disk 12 is to be engaged between a transducer and a pressure pad through the same apertures.

FIG. 2 shows a circular opening 26 formed centrally in one side of the housing 14 to reveal the metal-made hub 28 of the magnetic disk 12. The hub 28 has a spindle hole 30 formed centrally therein and a drive pin hole 32 formed eccentrically therein.

At 34 in FIGS. 1 and 2 is shown a file protect window formed through the housing 14 at one of its corners. Normally closed by a sliding cover 36, the file protect window 34 permits writing on the disk 12. The file protect window 34 may be uncovered to inhibit writing on the disk 12 by providing a light path through the housing 14. The associated disk drive may, however, either optically or mechanically sense whether the file protect window 34 is covered or uncovered.

Data Transfer System

Figure 3:
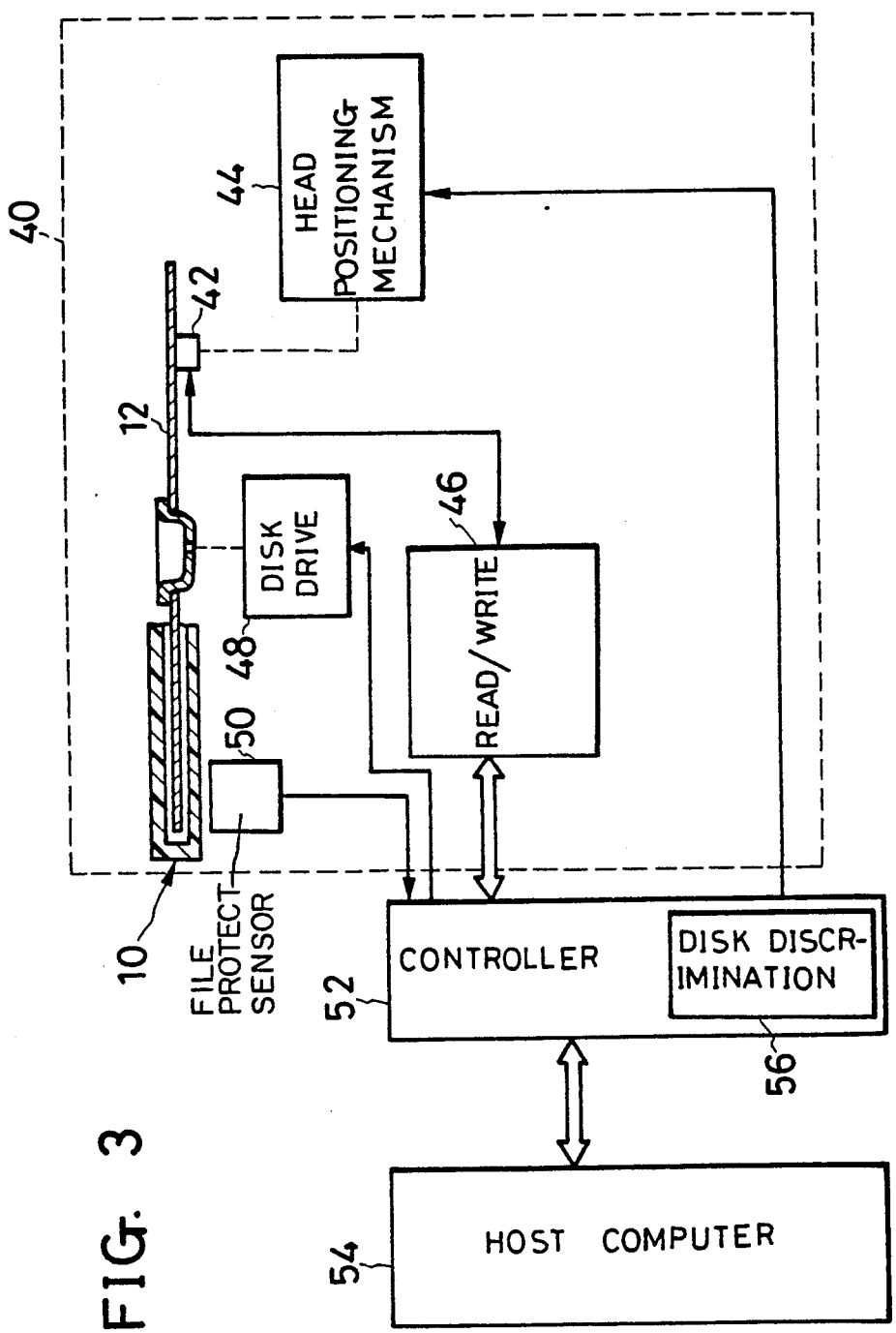
FIG. 3 is a block diagram of a data transfer system embodying the principles of our invention.

The data transfer system illustrated in FIG. 3 includes a disk drive 40 for selective use with the magnetic disk cartridges 10 of 1- and 4-MB storage capacities but of the same mechanical construction illustrated in FIG. 1. By the term "storage capacities" we mean the unformatted capacities of the disk cartridges, including those of not only the data fields but also the identification (ID) fields of the disks. We will later refer to the data fields and ID fields of the magnetic disks in more detail.

We also understand that the two types of disk cartridges 10 have no notch, aperture, marking or other means in or on their housings that distinguishes them from each other. Nor is the disk drive 40 equipped with a sensor or other means for optically or mechanically discriminating between the two types of disk cartridges.

For the convenience of disclosure we have illustrated the disk drive 40 in FIG. 3 on the assumption that the disk cartridges 10 are single sided. Thus the disk drive 40 has but one transducer or read/write head 42 for data transfer with the magnetic disk 12 of the disk cartridge 10 loaded therein. A transducer positioning mechanism 44 of any known or suitable construction is mechanically coupled to the transducer 42 for transporting the same across the record tracks on the disk 12. A read/write circuit 46 of known configuration is electrically connected to the transducer 42. A disk drive mechanism 48 of conventional design imparts rotation to the magnetic disk 12. Also included is a file protect sensor 50 disposed opposite the disk cartridge 10 positioned within the disk drive 40. The file protect sensor 50 produces an electric signal indicative of whether the file protect window 34, FIGS. 1 and 2, is covered or uncovered.

The data transfer system further includes a disk drive controller 52 and a host computer 54, both external to the disk drive 40. The controller 52 is connected to the transducer positioning mechanism 44, read/write circuit 46, disk drive mechanism 48 and file protect sensor 50. The controller 52 controls the operation of the disk drive 40 under the direction of the host computer 54. Although the controller 52 is largely conventional in construction, it differs from the conventional one in having means 56 for discriminating between the 1- and 4-MB disk cartridges in accordance with our invention. The controller 52 may be factory preprogrammed to carry out the disk capacity discrimination method of our invention, as will be later explained in more detail.

Figures 4A, 4B:
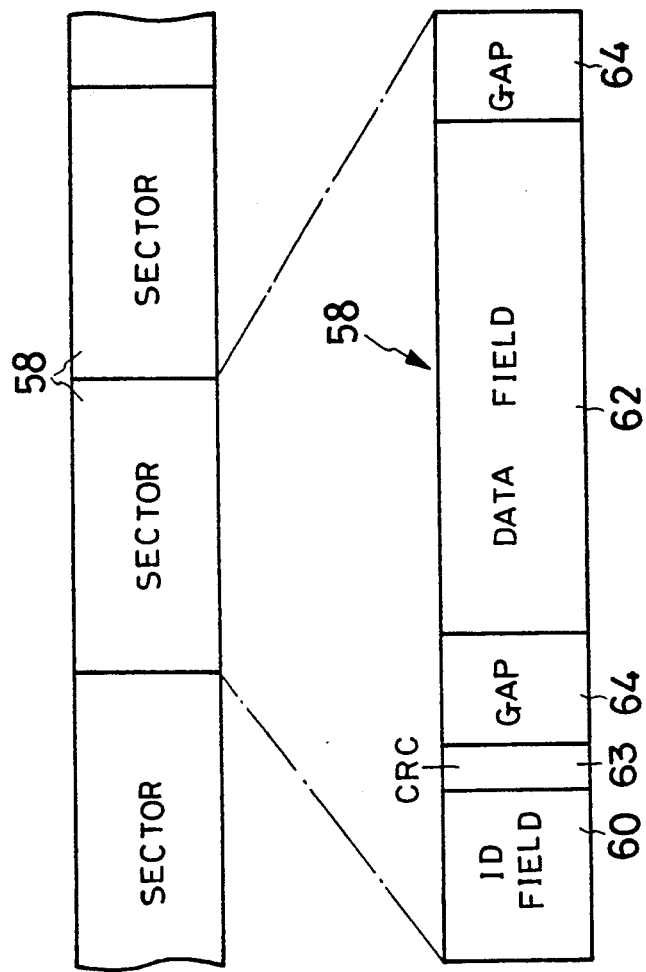
FIG. 4A is a fragmentary diagram of an explanatory nature showing the track sectors of the disk cartridge of FIG. 1.
FIG. 4B is also a fragmentary diagram of an explanatory nature showing the constituent ends of each track sector of FIG. 4A.

Magnetic disks must be formatted preparatory to writing of user data thereon. FIGS. 4A and 4B are explanatory of the standard format of each record track of magnetic disks. Usually, both 1- and 4-MB disk cartridge have 80 tracks arranged concentrically on one side (160 tracks if double-sided). Each track of the 1-MB disk cartridge consists of nine sectors 58 shown in FIG. 4A, and its maximum bit density is 8717 BPI. Each track of the 4-MB disk cartridge consists of 36 sectors, and its maximum bit density is 34,868 BPI.

As shown in FIG. 4B, each track sector 58 resolves itself into an ID field 60 and a data field 62, with intervening gaps 64. The ID field 60 records synchronization, address, identification, and cyclic redundancy check (CRC) data. The data field 62 records user data in addition to synchronization, address and CRC data. Formatting involves the writing of the required data at the ID fields 60 of all the track sectors 58.

Method of Disk Discrimination

Figure 5:
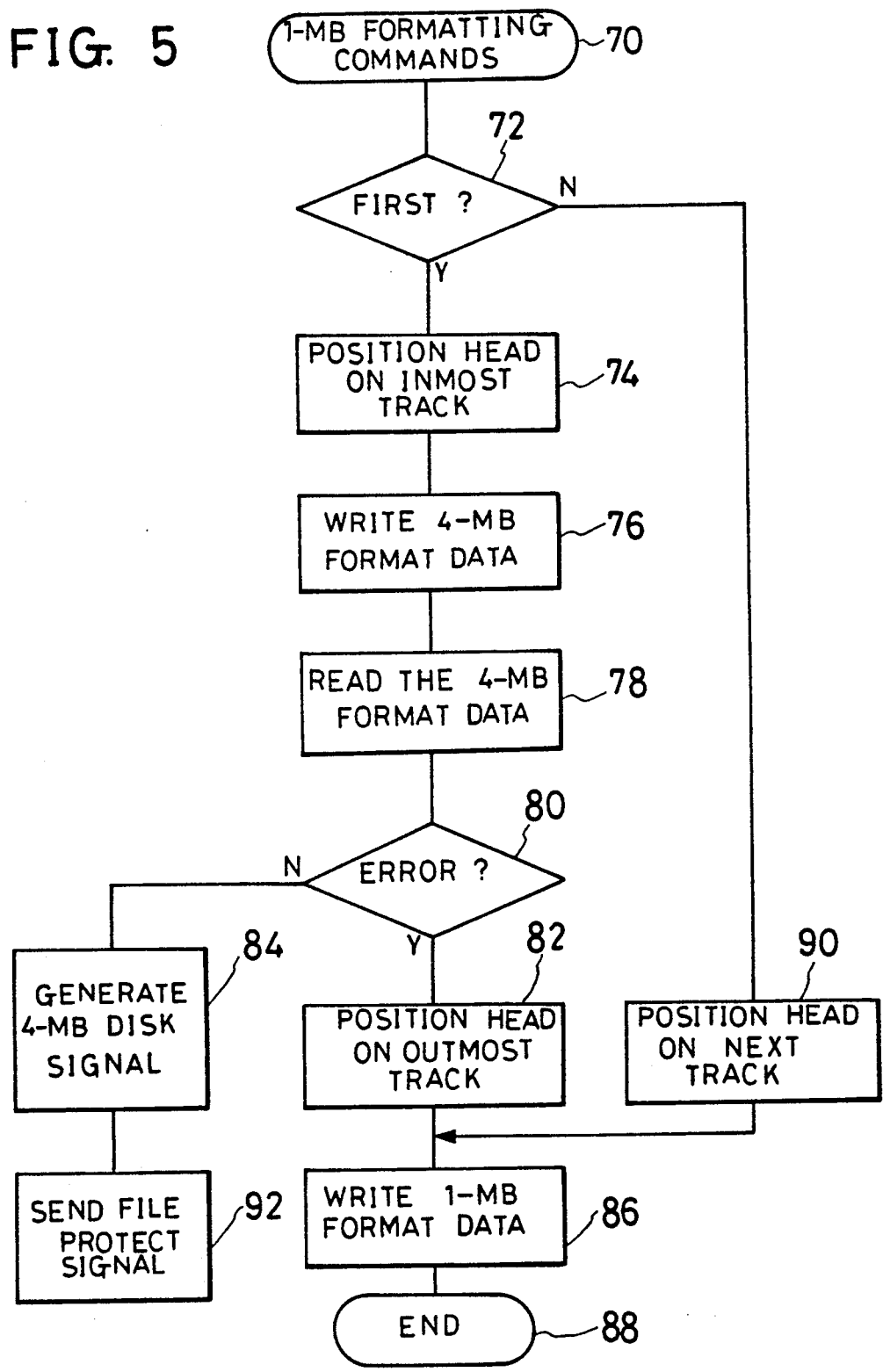
FIG. 5 is a flow chart showing the disk discrimination program introduced into the disk drive controller of the FIG. 2 system for the practice of our invention.

Reference is directed to the flow chart of FIG. 5 for a discussion of the method of discriminating or distinguishing between the 1- and 4-MB disk cartridges 10 as either of these disk cartridges is loaded in the disk drive 40 of FIG. 3. As has been stated, the disk drive controller 52 is factory preprogrammed for practicing the method of our invention. The flow chart represents the program built into the disk drive controller 52. We have shown the flow chart on the assumption that the data transfer system is capable of handling both 1- and 4-MB disk cartridges but is normally conditioned to format the loaded disk on the 1-MB basis. Therefore, upon loading of a 4-MB disk cartridge, the controller 52 is preprogrammed to identify it as such and to prevent its formatting on the 1-MB basis.

The disk capacity discrimination program starts as the host computer 54 begins delivering a series of 1-MB formatting commands to the disk drive controller 52 at step 70 following the loading of a 1- or 4-MB disk cartridge 10 in the disk drive 40. The first step 72 of the controller 52 in response to each incoming 1-MB formatting command is to determine whether or not that is the first of a series of formatting commands for the loaded disk. As is usual in the art, the disk is formatted track by track, with each track formatted as the host computer 54 delivers one formatting command to the disk drive controller. But it is useless to identify the storage capacity of the loaded disk for each of its tracks. Accordingly, the controller 52 responds only to the initial 1-MB formatting command from the host computer 54 for executing the disk capacity discrimination program preparatory to the formatting of the first track on the disk.

If the input 1-MB formatting command is the first of the expected series of such commands for the loaded disk, the controller 52 proceeds at step 74 to cause the transducer positioning mechanism 44 of the disk drive 40 to move the transducer 42 to the inmost track on the disk 12. Typically, the controller 52 delivers to the transducer positioning mechanism 44 a required number of stepping pulses, as well as a stepping direction signal, for positioning the transducer on any desired track on the disk 12. Usually, in the disk drive art, the transducer 42 is positioned on the outmost track through a recalibration procedure when the data transfer system is switched on, or at the start of disk formatting. The transducer 42 is therefore transported from the outmost to the inmost track for disk discrimination in this particular example of the method of our invention.

The next step 76 is the writing of the 4-MB format data on the inmost track. The controller 52 delivers the 4-MB format data to the read/write circuit 46, which then causes the transducer 42 to write the data on the inmost track. The disk 12 is in rotation during such writing as the disk drive mechanism 48 operates under the direction of the controller 52.

Then, at step 78, the 4-MB format data that has been written on the inmost track at the preceding step 76 is read out. Since the transducer 42 has already been on the inmost track, the 4-MB format data can be readily retrieved with the continued rotation of the disk 12. Receiving the output from the transducer 42, the read/write circuit 46 delivers the recovered 4-MB format data to the controller 52.

Then the controller 52 determines at step 80 whether the recovered 4-MB format data contains errors or not. Such errors can be most advantageously detected from the CRC data 63. It proves that the loaded disk cartridge 10 is not of the 4-MB capacity but of the 1-MB one if the format data contains errors and is undecipherable. If the format data is decipherable, on the other hand, then it follows that the loaded disk cartridge 10 is of the 4-MB capacity. As may now be apparent, we have chosen the inmost track for discrimination between 1-and 4-MB disk cartridges because it is the shortest in length, and the highest in bit density (34,868 BPI), of all the record tracks on the disk. Consequently, if the 4-MB format data is written on the inmost track of the 1-MB disk, the controller 52 is most easily detectable errors from the recovered format data.

Then the controller 52 takes either of two different steps 82 and 84 depending upon whether the loaded disk cartridge 10 proves to be of the 1- or 4-MB capacity at the step 80. If the cartridge is of the 1-MB capacity, it can be formatted under the direction of the host computer 54. Therefore, according to the method of our invention, the controller 52 is programmed to cause the positioning mechanism 44 to reposition the transducer 42 on the outmost track (Track Zero) on the disk 12 at the step 82. Then, at the next step 86, the required 1-MB format data is written on the outmost track. The formatting of the first track on the disk is thus completed at step 88.

Then, on receipt of a second 1-MB formatting command from the host computer 54, the controller 52 proceeds from step 72 to step 90, bypassing the steps 74-82. At the step 90 the controller 52 causes the positioning mechanism 44 to position the transducer 42 on the next track on the disk 12. Then the 1-MB format data is written on that track at the step 86. The same procedure is repeated thereafter for formatting all the tracks on the disk 12 as the host computer 54 successively delivers the rest of the 1-MB formatting commands to the controller 52.

On the other hand, if the loaded disk cartridge 10 proves to be of the 4-MB capacity at the step 80, the controller 52 generates at the step 84 a 4-MB signal indicative of the fact that the loaded disk cartridge 10 is of the 4-MB capacity. Then, at the next step 92, the controller 52 delivers a file protect signal to the host computer 54, just as it does when the output from the file protect sensor 50 indicates that the file protect window 34, FIGS. 1 and 2, in the cartridge housing 14 is uncovered to inhibit writing on the disk 12. Accordingly, in response to the input file protect signal, the host computer 54 discontinues the production of the series of 1-MB formatting commands. It will thus be appreciated that the program of the host computer need not be altered in the practice of our invention.

As is standard in the art, the host computer 54 will then visually indicates that the loaded disk cartridge 10 cannot be formatted because of the wrong storage capacity. The user may then input a 4-MB format command for having the loaded 4-MB disk cartridge 10 formatted in the 4-MB mode or may replace it with a 1-MB disk cartridge.

Possibly, the disk cartridge may already be formatted when loaded in the disk drive 40. In that case the magnetic disk 12 contains in its ID fields the data representative of its storage capacity. This data may be read to determine whether it is of either 1- or 4-MB capacity. No particular means is therefore needed for ascertaining the storage capacities of preformatted disk cartridges.

Although we have shown and described our invention in very specific aspects thereof, and as adapted for discrimination between 1- and 4-MB magnetic disk cartridges, we do not wish our invention to be limited by the exact details of this disclosure. Our invention may, of course, be applied to discrimination between disk assemblies of other storage capacities. In such additional applications of our invention some departures from the illustrated embodiment may be resorted to and may even be preferable. For example, the storage capacities of disk assemblies to be discriminated from each other may differ as widely as, say, 1 MB and 9 MB. In such cases, formatting errors will be detectable if the 9-MB format data is written on the outmost track of the 1-MB disk. It will therefore be unnecessary to move the transducer from the outmost to the inmost track, as at the step 74 in the flow chart of FIG. 5 and to move the transducer back to the outmost track as at the step 82. Thus, as the steps 74 and 82 are eliminable, the discrimination program will become much simpler than that of FIG. 5.

What is claimed is:

1. A method of distinguishing a first unformatted disk of a first storage capacity from a second unformatted disk of a second storage capacity as the first or second disk is loaded in a disk drive, the first storage capacity being less than the second storage capacity, which method comprises:
   (a) writing predetermined track format data suitable for the second storage capacity on the loaded disk;
   (b) reading the predetermined track format data from the loaded disk;
   (c) detecting an error in the predetermined track format data which has been read from the loaded disk in the step (b); and
   (d) determining that the loaded disk is of the first storage capacity based upon the detection of said error.

2. The disk distinguishing method of claim 1 wherein the predetermined track format data suitable for the second storage capacity is written only on a predetermined inmost track on the loaded disk.

3. The disk distinguishing method of claim 1 wherein the predetermined track format data suitable for the second storage capacity is written only on a predetermined outmost track on the loaded disk.

4. The disk distinguishing method of claim 1 wherein the track format data contains cyclic redundancy check data, and wherein the loaded disk is determined as being of the second storage capacity depending upon whether an error is detected from the cyclic redundancy check data in step (c).

* * * * *